US 6,359,900 B1

(12) United States Patent
Dinakar et al.

(10) Patent No.: US 6,359,900 B1
(45) Date of Patent: Mar. 19, 2002

(54) METHOD AND SYSTEM FOR CONTROLLING ACCESS TO A RESOURCE

(75) Inventors: Sitaram Dinakar, Bangalore; Krishanu Seal, New Delhi, both of (IN)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/057,906

(22) Filed: Apr. 9, 1998

(51) Int. Cl.$^7$ ................................................ H04L 12/43
(52) U.S. Cl. ....................................... 370/458; 370/412
(58) Field of Search ................................. 370/412, 418, 370/429, 442, 458, 413, 414, 415, 416, 417, 468, 461, 395, 352, 353, 337, 229, 230, 235

(56) References Cited

U.S. PATENT DOCUMENTS

| | | | | |
|---|---|---|---|---|
| 5,390,184 A | * | 2/1995 | Morris | 370/353 |
| 5,533,020 A | | 7/1996 | Byrn et al. | 370/395 |
| 5,870,629 A | * | 2/1999 | Borden et al. | 710/44 |
| 5,917,822 A | * | 6/1999 | Lyles et al. | 370/395 |
| 5,936,958 A | * | 8/1999 | Soumiya et al. | 370/395 |
| 6,067,301 A | * | 5/2000 | Aatresh | 370/418 |
| 6,072,772 A | * | 6/2000 | Charny et al. | 370/229 |
| 6,072,800 A | * | 6/2000 | Lee | 370/412 |
| 6,091,708 A | * | 7/2000 | Matsunuma | 370/223 |
| 6,101,193 A | * | 8/2000 | Ohba | 370/429 |
| 6,104,700 A | * | 8/2000 | Haddock et al. | 370/235 |
| 6,134,217 A | * | 10/2000 | Stiliasdis et al. | 370/232 |
| 6,137,787 A | * | 10/2000 | Chawla et al. | 370/337 |

OTHER PUBLICATIONS

"Cisco IOS Software Features for Differentiated Class of Service for Internetworks", Cisco Corp., World Wide Web publication, publication date unknown.

"Start–time Fair Queuing: A Scheduling Algorithm for Integrated Services Packet Switching Networks", Goyal, et al., SIGCOMM'96, Aug. 1996.

*Analysis and Simulation of a Fair Queueing Algorithm*, by Alan Demers, Srinivasan Keshaut and Scott Shenker, Xerox Parc, Palo Alto, CA (1989).

* cited by examiner

*Primary Examiner*—Alpus H. Hsu
*Assistant Examiner*—Brian Nguyen
(74) *Attorney, Agent, or Firm*—Dinsmore & Shohl LLP (57) ABSTRACT

A method and system for controlling access of a resource among several users of a resource. A plurality of service queues are established, each service queue handling requests for a predetermined range of the resource. A plurality of time slots are also established, and each service queue has a number of time slots in proportion to the amount of resource handled by that queue. One or more requestors request access to the resource, indicating a desired amount of the resource. Each request is assigned to one of the service queues based on the requested amount of the resource. A reference to the request is inserted in a number of slots associated with the queue to which the requestor was assigned. The references in the slots establish a service order which controls the order and frequency with which a requestor can access the resource. A quota can be established for each requestor to prevent any requestor from using a disproportionate amount of the resource. The method and system of the present invention is highly efficient and provides Quality of Service guarantees for multimedia traffic.

15 Claims, 6 Drawing Sheets

| QUEUES | NUM SLOTS | SLOT INTERVAL | PREDETERMINED RANGE |
|--------|-----------|---------------|---------------------|
| 1 | 1 | 8 | 0-6.66% |
| 2 | 2 | 4 | 6.67%-20% |
| 3 | 4 | 2 | 20.01%-46.66% |
| 4 | 8 | 1 | 46.67%-98% |

FIG. 3

| REQUESTOR | REG. B/W | APPOINTED QUEUE | QUOTA INCREMENT |
|-----------|----------|-----------------|-----------------|
| R1 | 5 | 1 | 20K |
| R2 | 25 | 3 | 100K |
| R3 | 50 | 4 | 200K |

FIG. 4

| SLOTS | |
|-------|---|
| 1 | R1, R3 |
| 2 | R2, R3 |
| 3 | R3 |
| 4 | R2, R3 |
| 5 | R3 |
| 6 | R2, R3 |
| 7 | R3 |
| 8 | R2, R3 |

FIG. 5

ORDER
R1, R3, R2, R3, R3, R2, R3, R3, R2, R3, R3, R2, R3

FIG. 6

| REQUESTOR | PACKETS |
|---|---|
| R1 | [10] [5] [10] [30] |
| R2 | [20] [30] [50] [60] |
| R3 | [50] [60] [40] [70] [30] |

FIG. 7

PACKET PROCESSING ORDER
R1 [10]  R3 [50]  R2 [20]  R3 [60]  R3 [40]
R2 [30]  R2 [50]  R1 [5]   R3 [70]  R2 [60]

METHOD AND SYSTEM FOR CONTROLLING ACCESS TO A RESOURCE

FIELD OF THE INVENTION

This invention relates generally to resource allocation in a computer system, and particularly relates to a method and system for controlling access to a resource among several users of the resource.

BACKGROUND OF THE INVENTION

Electronic systems often have one or more resources which must be shared among several users. For example, in a single processor computer running a multi-tasking operating system, many tasks simultaneously contend for processor resources. Similarly, in a networked environment, many tasks contend for access to a fixed bandwidth communications channel to communicate information from one computer to another. During heavy use of the network, it is not unusual that contention for access to the channel becomes so high that data is not delivered from one computer to another computer in a timely fashion. For some purposes, such as data backup or printer traffic, delayed packet transmissions do not cause any serious problems. But for other applications delayed data transmissions can be extremely problematic. For example, applications which use a combination of data, audio, and video packets to create multimedia software programs are currently very popular. The transfer of audio and video packets over a network poses two problems. First, audio and video packets, and particularly video packets, use a significant amount of bandwidth. Second, if audio and video packets are not delivered in a timely fashion, a user will discern discontinuities in the audio or video presentation. In heavily congested networks, these discontinuities can be great enough to completely render the audio and/or video transmissions incomprehensible.

Because such multimedia traffic is becoming a larger portion of overall network traffic, and because many businesses have limited network bandwidth, there has been an effort in the computer industry to develop mechanisms which can provide Quality of Service transmission for multimedia packets over existing communication channels. Quality of Service (QOS) relates to the ability to deliver data, audio and video packets over a channel at a rate that eliminates perceptible video and/or audio discontinuities. QOS is required to deliver desirable multimedia applications. Some solutions have involved calculating "deadlines" for each packet, and/or maintaining each incoming packet in a sorted order. The problem with these scheduling mechanisms is that they are computationally expensive, and can use a substantial amount of a processor for the sole purpose of allocating the communications channel among several different requestors. Of course, processor utilization devoted to resource allocation is not available for other useful work. Ideally, mechanisms for controlling access to such a resource among many different users should be highly efficient to minimize any effect caused by the overhead of the allocation mechanism.

Such resource scheduling/allocation mechanisms ideally satisfy several conditions. First, the wait time for packets should be inversely proportional to a requestor's requested bandwidth of the channel. Also, non-multimedia traffic should equitably share the communications channel with multimedia traffic.

It is apparent that a method and system which efficiently controls access to a resource among several requestors, and can provide Quality of Service guarantees for multimedia traffic while still servicing non-multimedia traffic would be highly desirable.

SUMMARY OF THE INVENTION

It is one object of this invention to provide a method and system for scheduling access to a resource among a plurality of requestors in an efficient manner.

It is another object of the present invention to provide a method and system which can provide Quality of Service guarantees to multimedia traffic over a communications channel in a highly efficient manner.

It is yet another object of the present invention to provide a method and system which provides access to a communications channel in a manner such that the wait time for data packets is inversely proportional to a requestor's requested bandwidth.

It is still another object of the present invention to provide a method and system which provide Quality of Service guarantees to multimedia traffic while ensuring that non-multimedia traffic has timely access to the channel.

Additional objects, advantages and novel features of the invention will be set forth in part in the description which follows, and in part will become apparent to those skilled in the art upon examination of the following or may be learned by practice of the invention. The objects and advantages of the invention may be realized and obtained by means of the instrumentalities and combinations particularly pointed out in the appended claims.

To achieve the foregoing and other objects and in accordance with the purposes of the present invention as described above, a method and system for controlling access to a resource is provided. The method includes establishing a plurality of service queues, each service queue handling requests for a particular range of a requested amount of a resource. A plurality of slots are also established. A predetermined number of slots are assigned to each service queue. When a request for a resource from a requestor is received, the requestor is assigned to one of the service queues depending on the amount of the requested resource. A reference to the requestor is inserted in the number of slots that have been assigned to the service queue to which the requestor was appointed. This process creates a service order that defines the order and number of opportunities to access the resource each requestor has during any particular cycle through the schedule order.

According to one embodiment of the invention, each queue handles requests for a particular amount of the resource, and the amounts handled by each queue is a multiple of the amount handled by an adjacent queue. A plurality of slots are established, and a number of slots are assigned to each queue as a function of the amount of the resource handled by that queue.

According to one embodiment of the invention, before references to a requestor are allocated in slots, it is first determined which of the slots is least-loaded. The initial reference is then inserted into the least-loaded slot. Preferably, a slot interval is established for each queue. The slot interval is used to allocate references in the slots such that each slot in which a reference is allocated for a respective requestor is a uniform number of slots away from any other slots in which a reference is allocated for the respective requestor. The references in the slots establish a service order that is used to determine the order and frequency with which requestors have access to the resource.

According to another embodiment of this invention, a quota increment is established to further refine access to and use of the resource. The quota increment is established as a function of the requestor's requested use of the resource. As a requestor accesses the resource, its actual use of the resource is deducted from a cumulative quota associated with the requestor. The cumulative quota is incremented at the end of each cycle through the slots by an amount equal to the quota increment. If a requestor utilizes all of its cumulative quota during a cycle through the slots, it cannot further access the resource until its cumulative quota is replenished.

In a preferred embodiment of this invention, the resource is a communications channel, and the requestor is a source of a stream of data to be transmitted over the communications channel.

According to another embodiment of this invention, a plurality of service queues $q_i$ are established, where i ranges from 1 to n. The second and subsequent service queues are serviced N times as often as service queue $q_{(i-1)}$. A number slots are established, the total number of slots being a multiple of $N^{(n-1)}$. Each respective service queue is assigned a number of slots, and the ratio of the number of slots assigned to each respective service queue to the total number of slots is the same ratio as the number of times the respective service queue will be serviced to the number of times the service queue $q_n$ will be serviced. Based on the requested amount of the resource, the requestor is assigned to one of the service queues. A reference to the requestor is allocated in the number of slots associated with that particular service queue. Preferably, a slot interval is established for each queue, such that the slot interval $S_i$ for a respective service queue $q_i$ is: $S_i = N^{(n-i)}$.

According to yet another embodiment of this invention, a system for scheduling access to a resource is provided. The system includes a plurality of service queues, with each respective service queue being operative to accept a requestor requesting a predetermined range of a requested amount of a resource. A plurality of slots are created, and a predetermined number of slots is assigned to each respective service queue. Each requestor requests a particular amount of the resource, and the system appoints the request to one of the plurality of service queues based on the requested amount of the resource. The system allocates a reference to the requestor in a number of slots equal to the number of slots assigned to the service queue to which the requestor was appointed.

The present invention is highly efficient, and eliminates the need to maintain deadlines for each data packet, and the need to sort all incoming data packets. The present invention provides QOS guarantees, ensuring smooth multimedia presentations, while maintaining the ability to timely deliver non-multimedia traffic.

Still other objects of the present invention will become apparent to those skilled in this art from the following description wherein there is shown and described preferred embodiments of the invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to present preferred embodiments of the invention, examples of which are illustrated in the accompanying drawings, wherein like numerals indicate the same elements throughout the views.

DETAILED DESCRIPTION OF PREFERRED EMBODIMENTS

The present invention has application in scheduling and controlling access to a resource among a plurality of different requestors in a computer environment. While the invention will be described herein with regard to transmission of traffic over a communications channel, it will be appreciated by those skilled in the art that the invention has applicability to controlling access to other resources, such as a central processing unit by a plurality of threads.

The ability to transmit multimedia traffic, i.e. data packets, video packets, and audio packets over a communications channel in a timely fashion is becoming increasingly important. Unfortunately, networks in-use by many businesses today were installed five or ten years ago, and thus have limited bandwidth. Moreover, multimedia traffic, and especially video traffic, requires substantial amounts of bandwidth. In addition to the quantity of the data, multimedia transmissions must occur in a timely manner such that there are minimal delays between packets. Excessive delay between multimedia packets will result in choppy audio and/or video presentations.

According to one embodiment of the present invention, a method and system for controlling access to a communications channel among a plurality of requestors is provided. Each requestor has a flow of packets to transmit on the communications channel. The term "flow" will be used herein to refer to a respective requestor's access to the channel. The present invention is highly efficient, provides Quality of Service guarantees that ensures sufficient bandwidth for each admitted flow, and provides inter-packet wait times that are inversely proportional to the amount of requested bandwidth to ensure smooth audio and video presentation. The present invention is not limited to use on a local area network and can be used in larger telecommunication systems such as wide area networks and the like if such communications channel provides sufficient bandwidth.

Figure 1:
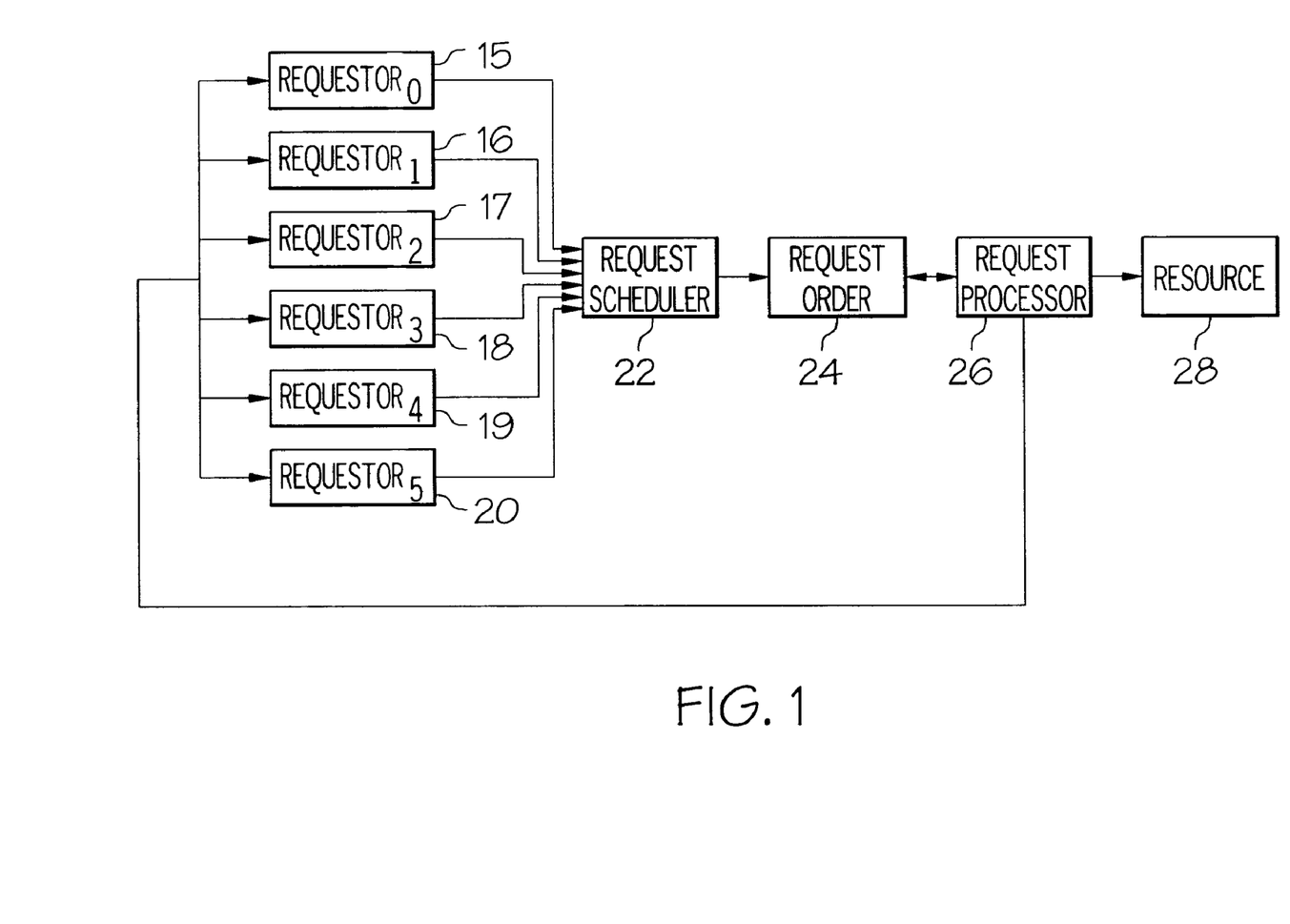
FIG. 1 is a block diagram illustrating aspects of one embodiment of the present invention.

FIG. 1 is a block diagram illustrating aspects of one embodiment of the present invention. A plurality of requestors 15–20 seek access to a resource 28. The requestors 15–20 could represent individual streams or flows of data, and the resource 28 could represent, for example, a communications channel. Each requestor 15–20 calls request scheduler 22 requesting a desired amount of resource 28. For example, requestor 15 may request 10% of the available bandwidth of resource 28, while requestor 16 requests 20% of the available bandwidth of resource 28. A request scheduler 22 establishes a plurality of service queues for servicing requests. Each service queue services requests for a particular amount of the resource 28. For example, service queue 1 may be used to service requests seeking 0–6.66% of the bandwidth of resource 28, queue 2 may service requests seeking 6.67–20% of the bandwidth, queue 3 may service requests seeking 20.01–46.66% of the bandwidth and queue 4 may service requests seeking 46.67–99% of the bandwidth of resource 28. These are merely exemplary ranges, and different numbers of queues and ranges of bandwidth could be utilized.

Request scheduler 22 establishes a plurality of time slots to be used in conjunction with the service queues. The slots are used to generally establish a service order that offers each requestor access to the resource in proportion to the amount of requested resource. For example, assuming the four queue system and bandwidths mentioned above, eight time slots may be used. Each of the eight slots are assigned to queue 4, four of the eight slots are assigned to queue 3, two slots are assigned to queue 2, and one slot is assigned to queue 1. Thus, the number of slots assigned to a queue is a function of the amount of the resource handled by that respective queue.

Request scheduler 22 uses the requested range of the resource to determine to which queue the request should be appointed, and then assigns a reference to the requestor in the number of slots associated with that queue. Preferably, request scheduler 22 first determines which of the slots is least-loaded, i.e. has been assigned the least amount of bandwidth, and begins assigning slots to the respective request beginning with the least-loaded slot. Also preferably, request scheduler 22 establishes a slot interval for each queue that is used to ensure that each reference is assigned to a slot that is substantially a uniform distance away from other slots in which references to a particular requestor have been assigned. The references in the slots establish a service order 24. A request processor 26 continually traverses through the service order 24, and allows access to the resource 28 to the respective requestors 15–20 based on the order of the references contained in the service order 24.

In the example just described, it was assumed that each queue handles twice the amount of requested resource as the previous queue. Consequently, each queue is serviced two times as often as the previous queue. For example, queue 4 is serviced twice as often as queue 3, which is serviced twice as often as queue 2, which is serviced twice as often as queue 1. Thus, a requestor assigned to queue 4 will have twice the number of opportunities to access the resource as a requestor assigned to queue 3. These access opportunities are established through the use of the time slots. For example, requestors assigned to queue 4 will be assigned to all eight slots, requestors assigned to queue 3 will be assigned to four slots, requestors assigned to queue 2 will be assigned to two slots, and requestors assigned to queue 1 will be assigned to one slot.

The relationship between queues and time slots will be illustrated with an example. Assume that a requestor A requests 50% of the bandwidth of the channel and is assigned to queue 4, while a requestor B1 requests 25% of the bandwidth of the channel and is assigned to queue 3. A reference to requestor A1 is inserted in each of the eight slots. A reference to requestor B1 is assigned to four slots, the particular slots preferably being a uniform distance from one another. For example, references to requestor B1 may be assigned to slots 1, 3, 5 and 7. Next, a third requestor B2 is admitted by request scheduler 22 and is assigned to queue 3 based on its requested bandwidth. Requestor B1 could also be assigned to slots 1, 3, 5 and 7. The layout of the slots would be as follows:

Slot 1: A, B1, B2
Slot 2: A
Slot 3: A, B1, B2
Slot 4: A
Slot 5: A, B1, B2
Slot 6: A
Slot 7: A, B1, B2
Slot 8: A The service order 24 would then be as follows:

A, B1, B2, A, A, B1, B2, A, A,, B1, B2, A, A, B1, B2, A, A, B1, B2, A . . .

As illustrated, requestor A has twice the number of opportunities to access the resource as do requestors B1 or B2. However, in this service order, requestor A will sometimes get serviced sooner than it should have been had there been exactly two requestors A and B1 in the system, while requestor B2 gets delayed unnecessarily behind requestor B1 despite the fact that requestors B1 and B2 requested an identical share of the bandwidth.

One mechanism for correcting the resulting unfairness in the service order is to ensure that the first reference for each requestor is assigned to the least-loaded slot. For example, assuming requestor A and requestor B1 were initially assigned to the slots as discussed above, slot 2 would be the least-loaded slot prior to admitting requestor B2 to the service order. Thus, the initial reference to requestor B2 is assigned to slot 2. To ensure each reference is a uniform number of slots from other references to requestor B2, a two slot interval is used. Thus, references to B2 are inserted in slots 2, 4, 6 and 8 rather than in slots 1, 3, 5 and 7. The service order 24 would now be:

A, B1, A, B2, A, B1, A, B2, A, B1, A, B2 . . .

As illustrated, the approach of using the first available least-loaded slot does not suffer from the inherent bias associated with the first discussed service order.

Figure 2:
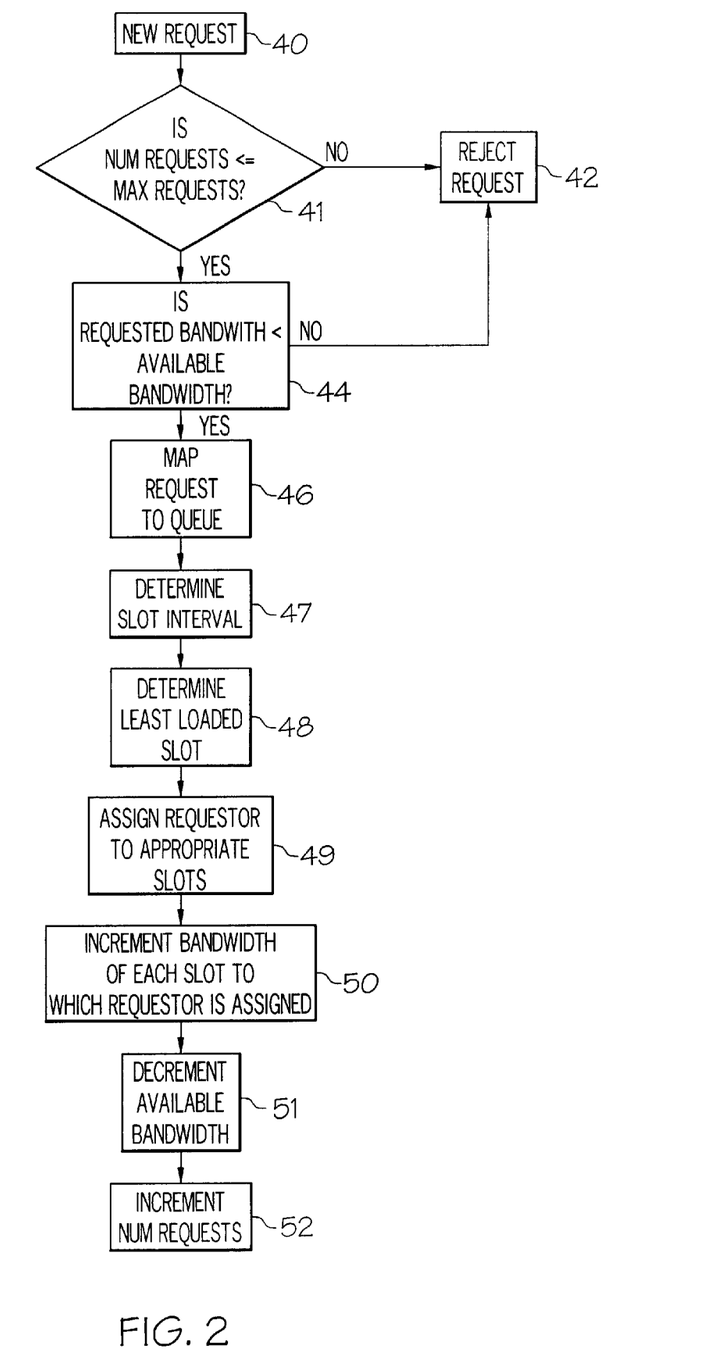
FIG. 2 is a flow diagram illustrating a method for scheduling requests for a resource according to one embodiment of this invention.

FIG. 2 is a flow diagram illustrating a method for generating a service order according to one embodiment of this invention. At block 40 a new requestor seeks access to the desired resource. At block 41 it is determined whether adding the request to the service order would surpass a maximum number of requests defined by the system. If so, then the request can be rejected at block 42. If the number of requests is less than the maximum number of requests allowed in the system, then at block 44 it is determined whether the requested bandwidth is less than the currently available bandwidth of the channel. If not, the request is rejected at block 42. This prevents the admission of more requestors, or flows, to the system than the channel can handle. A predetermined amount of bandwidth can be reserved to service non-multimedia traffic.

If the available bandwidth is sufficient to handle the request, then at block 46 the request is mapped to a particular queue based on the amount of the requested bandwidth. At block 47 the slot interval associated with the queue to which the request is mapped is determined. At block 48 the slots are examined to determine which slot is the first available least-loaded slot. At block 49 references to the requestor are assigned beginning with the first available least-loaded slot, and the slot interval is used to determine to which slots the references should be assigned. The bandwidth associated with each slot in which a reference to the request is inserted is incremented to maintain track of the total amount of bandwidth associated with each slot, for subsequent determinations of the least-loaded slot. At block 51 the total amount of available bandwidth is decremented by the amount of the requested bandwidth associated with the request. At block 52 the total number of requests in the system is incremented by one.

Figure 3:
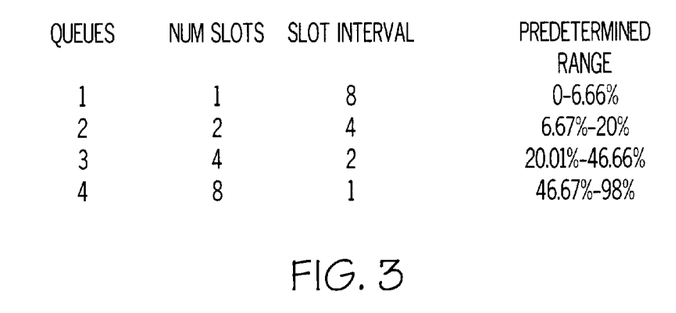
FIG. 3 is a table illustrating parameters associated with service queues and slots according to another embodiment of this invention.

FIG. 3 is a table illustrating parameters associated with queues and slots according to one embodiment of this invention. The parameters shown in FIG. 3 assume a total of four queues, and that each queue handles a requested bandwidth that is twice the bandwidth handled by a subsequent queue. To implement such a system eight time slots are used. Queue 4 handles twice the amount of requested bandwidth of queue 3, and is assigned eight slots. Since there are a total of eight slots, the slot interval for queue 8 is one slot. Queue 3 handles requested bandwidths that are one-half the amount handled by queue 4, and is therefore assigned four slots. The slot interval for queue 3 is two. Queue 2 handles one-half the amount of requested bandwidth than that handled by queue 3, and is assigned two slots. The slot interval is four. Queue 1 handles one-half the requested bandwidth of queue 2, and therefore is assigned one slot. The slot interval for queue 1 is eight.

The values in the column "predetermined range" are calculated by dividing the number of slots assigned to a particular queue by the total number of slots. The predetermined range of values can be used to quickly determine to which queue a requestor should be assigned.

Figure 4:
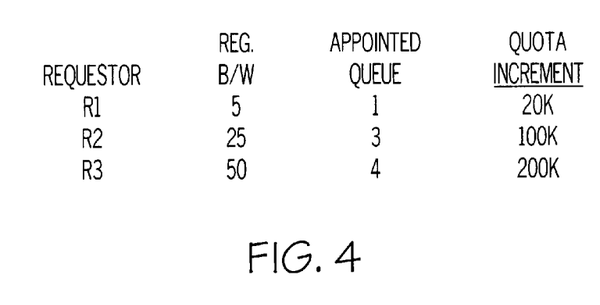
FIG. 4 is a table illustrating parameters of several exemplary requestors using the queues described in FIG. 3.

FIG. 4 contains a table illustrating three requestors, R1, R2 and R3 that have requested a particular amount of bandwidth of the communications channel. The column labeled "REQ. B/W" indicates the percentage of the total bandwidth requested by each requestor. The column labeled "APPOINTED QUEUE" identifies the queues to which the requestor is appointed based on the requestor's requested bandwidth. The column labeled "QUOTA" identifies the quota increment assigned to each requestor. The quota can be used to prevent any requestor from utilizing more than its requested bandwidth. The quota increment assigned to a requestor is based upon the requestor's requested bandwidth. For purposes of illustration, in the example illustrated in FIGS. 3–8, it is assumed that the total bandwidth of the communications channel is 400,000 bits per second (400 kbps). Since requestor R1 requested 5% of the total bandwidth, the quota increment established for requestor R1 is 20 k (5% of 400 kpbs).

Figure 5:
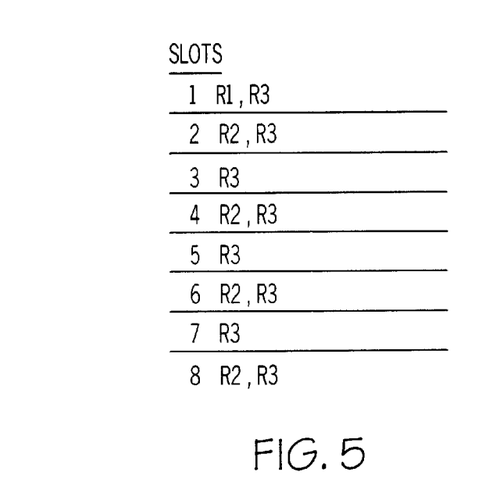
FIG. 5 is a table illustrating contents of the slots based on the parameters specified in FIGS. 3–4, according to one embodiment of this invention.

FIG. 5 shows an order of references after the admission of requestors R1, R2 and R3 by the request scheduler. The example provided in FIGS. 3–8 assumes that the requests to access the channel are made in the following order: R1, R2, and R3. Requestor R1 requests 5% of the bandwidth of the channel, and is therefore assigned to queue 1. Since queue 1 has one slot associated with it, a reference to R1 is inserted in the first least-loaded slot, which at the time of the request, is slot 1. Requestor R2 requests 25% of the bandwidth of the communications channel and is therefore assigned to queue 3. Queue 3 has four slots associated with it. At this point, slot 2 is the first available least-loaded slot. Thus, a reference to requestor R2 is inserted in slot 2. The slot interval associated with queue 3 is two, as shown in FIG. 3. Thus, a reference to requestor R2 is also inserted into slots 2, 4, 6 and 8. Requestor R3 requests 50% of the total bandwidth of the channel, and is therefore appointed to queue 4. Queue 4 has eight slots associated with it. Since there are a total of eight slots in the system, the slot interval is 1, and a reference to R3 is inserted in each slot. FIG. 5 reflects the layout of the slots after the admission of requestors R1, R2 and R3.

Figure 6:
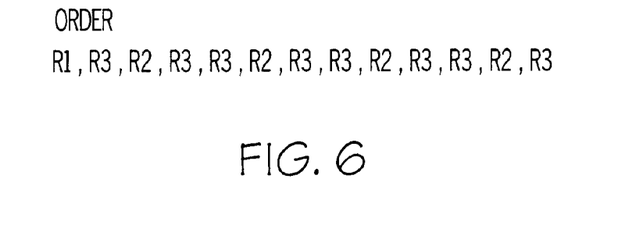
FIG. 6 illustrates the service order based on the contents of the slots shown in FIG. 5.

FIG. 6 shows the resulting processing order of the requestors based on the layout of the slots as shown in FIG. 5. FIG. 6 reflects the order in which the requestors will be processed during one cycle through the slots. The order reflected in FIG. 6 was generated by traversing slots 1 through 8 as reflected in FIG. 5.

The service order shown in FIG. 6 determines the order and frequency with which a requestor has access to the communications channel. For example, requestor R1 will be given initial access to the communications channel. After requestor R1 transmits its packet of information, or, if requestor R1 has no information to transmit, requestor R3 is given access to the communications channel. Likewise, after requestor R3 transmits its packet, or, if requestor R3 has no packet to transmit, requestor R2 is given access to the communications channel. While each requestor can have access to the channel in accordance with the service order, it may be the case that any particular requestor does not have anything to transmit on the communications channel at a particular time. This does not mean that the communications channel will be idle. The processing of the service order is independent of the use of the communications channel in that the determination of what requestor can access the channel is happening concurrently with the actual use of the communications channel by a requestor.

Figure 7:
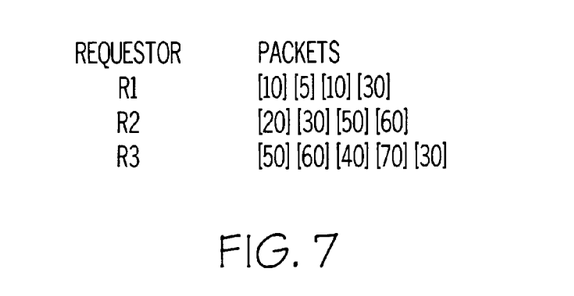
FIG. 7 is a table containing exemplary packets for transmission on a communications channel.

FIG. 7 is a table containing example packets for transmission by respective requestors R1, R2 and R3. The number associated with each packet is the packet size in kilobits (kb). The order of packet transmission in FIG. 7 is from left to right. For example, requestor R1 wishes to transmit the following packets in the following order: 10, 5, 10 and 30. A traversal through the entire service order shown in FIG. 7 is referred to as one "cycle". Each requestor has a cumulative quota and a quota increment. Initially, the cumulative quota is equal to the quota increment. At the beginning of each cycle, each requestor's quota is incremented by the amount of the quota increment associated with that requestor. The cumulative quota associated with the requestor is decremented by the amount of data the requestor transmits in each packet. For example, after requestor R1 transmits its first packet, the cumulative quota associated with requestor R1 will be decremented by a value of 10 k. Before any packet is transmitted on the communications channel, it is determined whether the cumulative quota value for that requestor is greater than the size of the packet to be transmitted. If not, the packet will not be transmitted and the next requestor in the service order will have the opportunity to use the communications channel. In this way, any given requestor is prevented from using proportionately more bandwidth than it requested. According to another embodiment of this invention, if the cumulative quota associated with a requestor is smaller than the size of the packet the requestor wishes to transmit on the communications channel, the packet is transmitted, but subsequent packets will not be transmitted until the cumulative quota is greater than the size of the previously transmitted packet.

Figure 8:
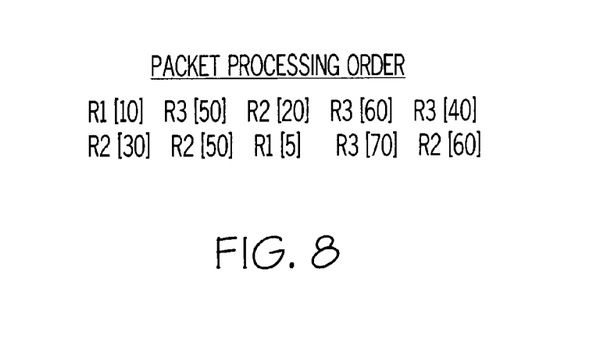
FIG. 8 is a table illustrating the order of packet transmission on the communications channel given the parameters set forth in FIGS. 3–7.

FIG. 8 reflects the order in which packets would be transmitted on the communications channel according to the parameters set forth in the examples illustrated in FIGS. 3–7. FIG. 8 will be discussed in conjunction with FIGS. 6 and 7. As shown in FIG. 6, requestor R1 is initially given an opportunity to transmit data on the communications channel. Requestor R1 transmits a 10 kb packet, as reflected in FIG. 8. The accumulated quota for requestor R1, which was initially set at 20 kb, is decremented by 10 kb. As shown in FIG. 6, requestor R3 now has an opportunity to transmit on the communications channel. Requestor R3 transmits a 50 kb packet, and its initial cumulative quota of 200 kb is decremented by 50 kb. Requestor R2 next transmits a 20 kb packet and its cumulative quota of 100 kb is decremented by 20 kb. Requestor R3 then transmits two packets of 60 kb and 40 kb respectively. Its cumulative quota is decremented by 100 kb. Requestor R2 transmits a 30 kb packet, and its cumulative quota is decremented by 30 kb. At this point requestor R3 has transmitted a total of 150 kb packets and its cumulative quota is 50 kb. As shown in FIG. 6, requestor R3 now has another opportunity to use the communications channel. However, requestor R3 has a 70 kb packet to transmit and its cumulative quota is only 50 kb. Therefore, requestor R3 cannot transmit data on the communications channel because the packet to transmit is greater than requestor R3's cumulative quota. Consequently, requestor R3 will no longer be provided access to the communications channel during this particular cycle of the service order. Requestor R2 next gets the opportunity to transmit data, and transmits a 50 kb packet. Requestor R2 has now transmitted packets of 20 kb, 30 kb and 50 kb, for a total of 100 kb. Requestor R2's cumulative quota is therefore 0. Requestor R2 will likewise get no more opportunities to transmit data during this particular cycle. Since only requestors R2 and R3 existed in the remainder of the cycle, the cycle ends and a new cycle begins. At the beginning of each cycle, the quota increment established for each requestor, as shown in FIG. 4, is added to the cumulative quota for each requestor. After the cumulative quotas have been incremented, the cumulative quota for requests R1, R2 and R3 will be 30 kb, 100 kb, and 250 kb respectively. R1 then transmits its second packet, which is a 5 kb packet, and its cumulative quota is decremented by 5 kb. R3 now has the opportunity to transmit its 70 kb packet, since its cumulative quota is 250 kb. Requestor R2 next gets the opportunity to use the communications channel and its 60 kb packet is less than its cumulative 100 kb quota, and thus requestor R2's 60 kb packet is transmitted. This process continues on as long requestors desire access to the communications channel.

While not illustrated in FIGS. 3–8 for simplicity, it should be noted that additional requestors will seek admission to the service order to use the communications channel, and existing users of the communications channel will ultimately terminate their use of the communications channel. Consequently, the service order as reflected in FIG. 6 can be constantly changing. It should also be noted that even where the cumulative requested bandwidth is less than the total bandwidth of the communications channel, the complete bandwidth of the communications channel can be utilized because some requestor always has access to the channel. This occurs because the traversal through the service order is independent of the use of the communications channel. Thus, where the total requested bandwidth is less than the total bandwidth of the channel, the present invention can allow requestors to use more than their requested bandwidth, but such use will preferably be in proportion to other requestor's use of the bandwidth.

Figure 9:
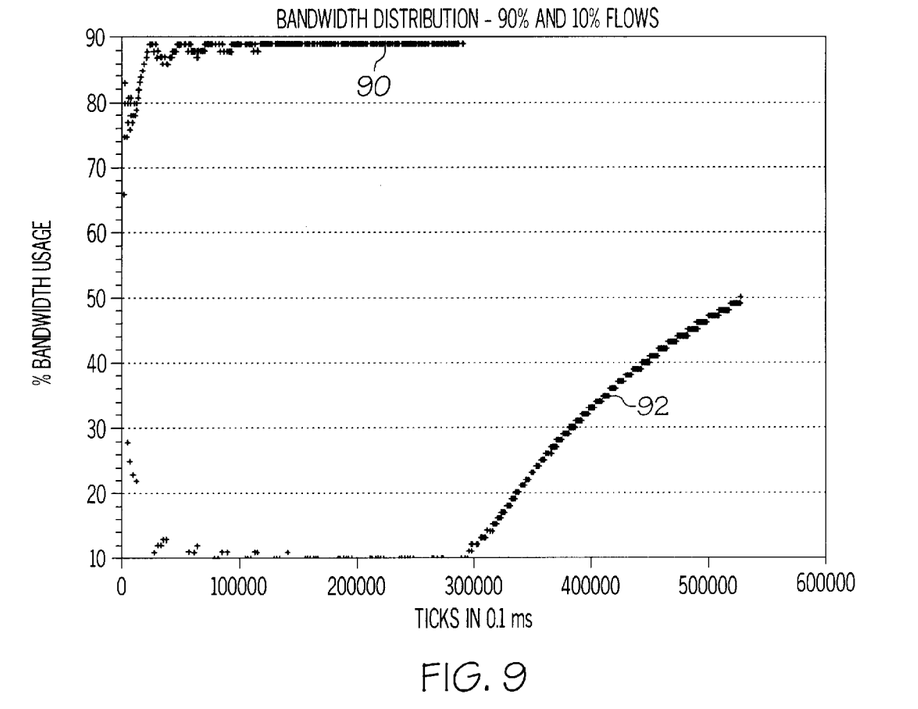
FIG. 9 is a graph illustrating packet transmissions of two requestors using a communication channel in accordance with one embodiment of the present invention.

FIG. 9 is a plot of packet transmissions of two requestors using a communication channel in accordance with the present invention. One requestor requested 10% of the total bandwidth of the channel. The actual bandwidth used by that requestor is indicated by line 92. A second requestor requested 90% of the total bandwidth of the channel, and the actual bandwidth usage of that requestor is indicated by line 90. As shown in FIG. 9, in the time frame in which both requestors were actively using the channel, the bandwidth distribution among the requestors was substantially equal to the requested bandwidth. Upon termination of the requestor represented by line 90, requestor 92 began to use the entire bandwidth of the channel until it terminated.

Figure 10:
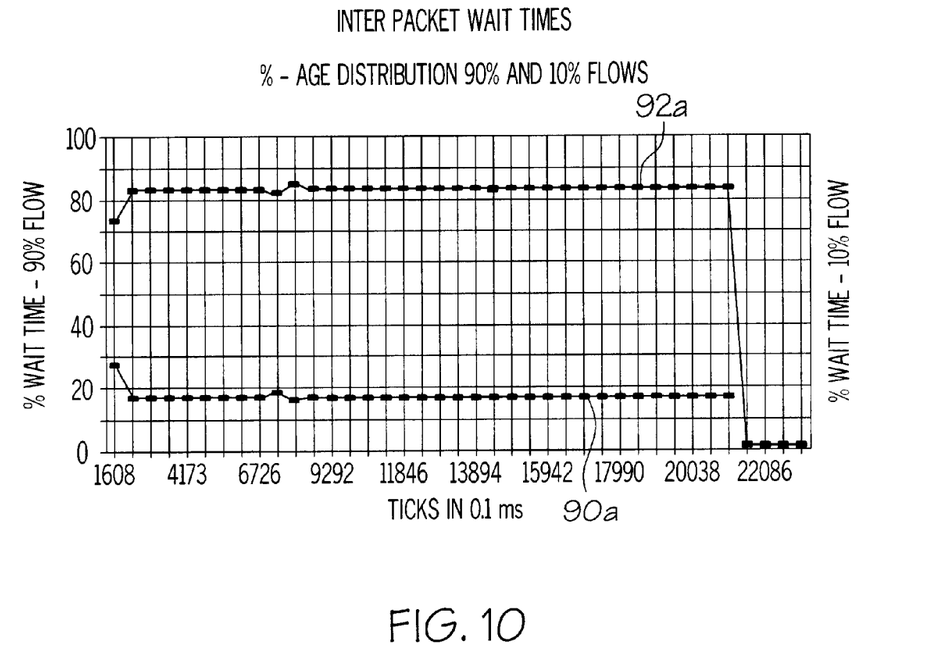
FIG. 10 is a graph illustrating inter-packet wait times of the packets transmitted by the two requestors illustrated in FIG. 9.

FIG. 10 is a graph illustrating the inter-packet wait times of the packets transmitted by the two requestors illustrated in FIG. 9. The y-axis illustrates what percentage of the total wait time each requestor illustrated in FIG. 9 incurred. Inter-packet wait time is quite important in multimedia traffic because delays between audio and/or video packets will cause disruptions in audio or video playback. Ideally, the inter-packet wait time between packets should be inversely proportional to the requestor's requested bandwidth. Line 92a represents the inter-packet wait time of the packets transmitted by the requestor represented by line 92 in FIG. 9. Line 90a represents the inter-packet wait time of the packets transmitted by the requestor represented by line 90 in FIG. 9. As illustrated in FIG. 10, the inter-packet wait time is inversely proportional to each requestor's use of the total bandwidth of the channel.

While multimedia traffic is becoming increasingly important, it is still necessary to insure that legacy data have access to the communications channel in a timely fashion. Such legacy data may be referred to as non-multimedia packets. The present invention can accommodate such legacy traffic in several different ways, while still providing the benefits of the invention as described herein. Common to each of the options is to aggregate all such legacy packets into a single flow of packets, and treat the flow as coming from a "virtual" requestor. A particular percentage of the overall channel bandwidth can be reserved and set aside to service the virtual requestor. Another option is configure the system to service packets from the virtual requestor only when the channel is unused by multimedia requestors. Another option is to allow the virtual requestor to consume unutilized bandwidth that becomes available once a multimedia requestor terminates, instead of allowing the remaining multimedia requestors to consume the available bandwidth of the channel.

The foregoing description of preferred embodiments of the invention has been presented for purposes of illustration and description. It is not intended to be exhaustive or to limit the invention to the precise form disclosed, and many obvious modifications and variations are possible in light of the above teachings. For example, while the embodiment shown was presented in terms of use of a communications channel, it is apparent that the present invention has applicability in any computer system in which a plurality of requestors seek the use of a limited number of resources. Moreover, while the illustration discussed a queue system wherein each queue handled a multiple of the requested bandwidth handled by a previous queue, it is apparent that the relationship between the bandwidth handled by a queue need not have such a relationship to bandwidth handled by previous queues. For example, a ten queue system could be implemented, wherein queue 1 handles requests for 0–10% of the bandwidth of the channel, queue 2 handles requests for 11–20% of the bandwidth, queue 3 handles request from 21–30% of bandwidth and so forth. Moreover, it is apparent that the quota system described herein could be implemented in any number of ways. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for scheduling the use of a resource, comprising:
   establishing a plurality of service queues, each respective service queue being operative to accept a requestor requesting a predetermined percentage of a resource;
   establishing a plurality of time slots, the slots being operative to maintain a reference to the requestor of the resource;
   assigning a predetermined number of slots to each respective service queue;
   receiving a request for the resource from the requestor, the request including the predetermined percentage of the resource;
   assigning the requestor to one of the service queues based on the predetermined percentage of the resource needed and the predetermined number of slots associated with the assigned service queue;
   allocating the reference to the requestor in a number of slots equal to the number of slots assigned to the service queue to which the requestor was assigned;
   offering access to the resource to the requestor by traversing the slots from a first slot to a last slot and offering access to the resource to the requestor according to the order of the requestor's reference in the traversed slots wherein each slot receives service based on a predetermined slot interval; and
   establishing a quota increment for each requestor based on the requested amount of the resource, and wherein the offering access to the resource step further comprises determining if the use of the resource will surpass a respective cumulative quota established for the respective requestor, and if so, denying the requestor the use of the resource, and if not, servicing the requestor, and decrementing the respective cumulative quota associated with the requestor by an amount corresponding to the use of the resource.

2. The method according to claim 1, wherein the allocating step further comprises determining which of the plurality of slots contains the least amount of additional references to additional requestors, and allocating the reference to the requestor in an optimal slot containing the least amount of the additional references to the additional requestors.

3. A method according to claim 1, further comprising incrementing the respective cumulative quota associated with each requestor by an amount equal to the quota increment established for that requestor.

4. A method according to claim 1, further comprising determining that a requestor has completed its use of the resource, and establishing a new quota increment for each remaining requestor.

5. The method according to claim 1, wherein the resource is a communications channel, and the requestor is a source of a stream of data to be carried over the communications channel.

6. The method according to claim 5, wherein the requested predetermined percentage of the resource comprises a desired percentage of the communications channel.

7. A method for scheduling the use of a resource, comprising:
   establishing a plurality of service queues $q_i$, where i is an integer and ranges from 1 to a finite integer number n corresponding to a last service queue, a second and all subsequent service queues being serviced by a finite integer number of N times as often as service queue $q_{(i-1)}$;
   establishing a plurality of time slots, the total number of slots being a multiple of $N^{(n-1)}$.
   assigning each respective service queue a number of the plurality of slots, the ratio of the number of slots assigned to each respective service queue to the total number of slots being the same ratio as the number of times the respective service queue will be serviced to the number of times service queue $q_n$ will be serviced;
   receiving a request for a resource from a requestor, the request including a requested predetermined percentage of the resource;
   appointing the requestor to one of the plurality of service queues based on the requested predetermined percentage of the resource needed by the requestor;
   allocating a reference to the requestor in any slots assigned to the queue to which the requestor was appointed;
   offering access to the resource to the requestor by sequentially traversing the slots of the appointed service queue from a first slot to a last slot and offering access to the resource to the requestor according to the order of the requestor's reference within the traversed slots of the appointed service queue wherein each slot receives service based on a predetermined slot interval; and
   establishing a quota increment for each requestor based on the requested amount of the resource, and wherein the offering access to the resource step further comprises determining if the use of the resource will surpass a respective cumulative quota established for the respective requestor, and if so, denying the requestor the use of the resource, and if not, servicing the requestor, and decrementing the respective cumulative quota associated with the requestor by an amount corresponding to the use of the resource.

8. A method according to claim 7, wherein the slot interval for each queue, and wherein the allocating a reference step further comprises using the slot interval to ensure that each slot in which a reference is allocated is a uniform number of slots away from any other slots in which a reference is allocated for the respective requestor.

9. The method according to claim 8, wherein the allocating step further comprises determining which of the plurality of slots is handling the lowest amount of bandwidth, and allocating the reference to the requestor in the slot containing the lowest amount of bandwidth.

10. A method according to claim 7, wherein the slot interval $S_i$ for a service queue $q_i$ is $S_i = N^{(n-1)}$.

11. The method according to claim 7, wherein the resource is a communications channel, and the requestor is a source of a stream of data to be carried over the communications channel.

12. The method according to claim 11, wherein the requested predetermined percentage of the resource comprises a desired amount of the communications channel.

13. A system for scheduling access to a resource, comprising:
   a plurality of service queues each respective service queue being operative to accept a requestor requesting a predetermined percentage of a resource;

a plurality of time slots, the slots being operative to maintain a reference to the requestor of the resource, and a predetermined number of slots being assigned to each respective service queue wherein each slot is serviced based upon a predetermined slot interval;

the requestor being operative to issue a request for the resource, the request including the predetermined percentage of the resource;

the system being operative to appoint the requestor to one service queue based on the predetermined percentage of the resource needed and the slots assigned to the service queue; and the system being operative to allocate the reference to the requestor in a number of slots equal to the number of slots assigned to the service queue to which the requestor was appointed, access is given to the requestor of the resource by sequentially traversing the slots from a first slot to a last slot and according to the order of the requestor's reference within each slot.

14. The system according to claim 13, wherein the system is further operative to determine which of the plurality of slots contains the least amount of additional references to additional requestors, and wherein at least one optimal reference to the requestor is allocated in the slot containing the least amount of the additional references to the additional requestors.

15. The system according to claim 13, wherein the resource is a communications channel, and the requestor is a source of a stream of data to be carried over the communications channel.

* * * * *